US012778315B1

(12) United States Patent
Foreman

(10) Patent No.: US 12,778,315 B1
(45) Date of Patent: Nov. 3, 2026

(54) CAR SEAT ROCKER

(71) Applicant: John Bernard Foreman, Mill Creek, WA (US)

(72) Inventor: John Bernard Foreman, Mill Creek, WA (US)

( * ) Notice: Subject to any disclaimer, the term of this patent is extended or adjusted under 35 U.S.C. 154(b) by 414 days.

(21) Appl. No.: 17/744,666

(22) Filed: May 14, 2022

(51) Int. Cl.
*A47D 9/02* (2006.01)
*B60N 2/28* (2006.01)

(52) U.S. Cl.
CPC ............. *A47D 9/057* (2022.08); *B60N 2/283* (2013.01); *B60N 2/2845* (2013.01)

(58) Field of Classification Search
CPC ......... A47D 9/057; B60N 2/283; A47C 3/029
See application file for complete search history.

(56) References Cited

U.S. PATENT DOCUMENTS 11,684,174 B1 * 6/2023 Randle ..................... A47D 1/10 297/250.1
2005/0264063 A1 * 12/2005 Babcock ................ A47D 13/02 297/250.1
2010/0176631 A1 * 7/2010 Ogle ........................ A47D 9/04 297/260.2
2021/0316775 A1 * 10/2021 Bell ....................... A47D 9/016

FOREIGN PATENT DOCUMENTS

DE 202020101797 U1 * 6/2020
DE 202021002814 U1 * 11/2021
DE 102021110005 A1 * 10/2022 ........... A47D 13/107
EP 1360917 A1 * 11/2003 ........... A47D 13/105
GB 2615308 A * 8/2023 ............. A47D 13/08

* cited by examiner

*Primary Examiner* — Timothy J Brindley

(57) ABSTRACT

A car seat rocker for attachment to a car seat comprises an inertial mass, an articulating bearing, a processor, a sensor, and a servo actuator for rotating the inertial mass about the bearing and relative to the car seat in response to the processor. The processor may filter data from the motion sensor and use the filtered data for determining angular velocity and phase alignment of the car seat. The processor may use artificial intelligence to analyze the angular velocity and phase alignment and to calculate timing and drive for rotation of the inertial mass for pumping the car seat to rock at about a resonant frequency and to maintain the rocking.

20 Claims, 9 Drawing Sheets

CAR SEAT ROCKER

FIELD OF THE PRESENT TECHNOLOGY

The present technology relates generally an attachment for rocking a car seat using artificial intelligence applied to process control.

BACKGROUND

As many parents have learned, babies and infants tend to fall asleep quickly in a moving car. In fact, parents often resort to driving a fussing baby or infant around and around to get them to fall asleep. However, this consumes gasoline and is generally inefficient. Moreover, driving around requires the services of a driver. And the baby often awakens upon parking the car.

Rocking a cradle also encourages babies and infants to fall asleep. Similarly a rocking chair can be used. But the motion of a chair or cradle rocking is substantially different from that of a moving car and is often less effective than driving around. Moreover, like driving a car, rocking a cradle or chair requires the services of a person in the form of a parent or sibling or aunt or uncle or grandparent, etc. And the baby often awakens when the person rocking the bed tires and stops.

Windup or electrically pushed cradles or swings suspended from a frame, have been used to replace a person. But again this motion is different from the motion of a car. Moreover, such cradles and swings are not readily portable and can be complex to set up and operate.

A solution to the above problems is to emulate the motion of a car using a portable device that is easy to set up. A partial solution is a car seat that is light weight, strong, portable, and has a handle. The handle can be used for carrying not only the car seat but also a baby or infant while in the car seat. Many car seats also have curved bottom rails that are configured to permit limited rocking back and forth while preventing tip over. But rocking a car seat will not emulate the motion of a car.

One currently available device is a car seat pusher, which is designed to be attached to a rail of the car seat and push against a surface such as a floor or wall to rock the car seat. Unfortunately, this rocking motion still does not emulate the motion of a car.

SUMMARY

The inventor has determined in the course of developing the claimed technology that an additional problem with the car seat pusher is that it uses substantial energy to overcome gravity and friction while pushing the seat. This limits the operation time when using an energy source such as a battery or mechanical spring. A solution to reducing the amount of energy used is to take advantage of a resonance of the car seat to minimize the energy to an amount necessary to overcome friction of the system. An unexpected advantage is that this also reduces the size and weight of a battery, contributing to portability.

The inventor also determined in the course of developing the claimed technology that another, unexpected problem with the rail mounted car seat pusher is that a surface such as the floor or wall is not always uniform or even, and arranging the pusher relative the surface can be challenging and the pushing action may not work.

In the course of developing the claimed technology, the inventor further discovered a unique method to overcome this problem by mounting a rocking device, which can also be referred to as simply a rocker, on the handle of the car seat as illustrated, e.g., in FIG. 1, and propelling the car seat using inertial mass of the handle mounted rocker without pushing against any surface adjacent or outside the car seat and rocker, but instead using only motion of the rocker relative to the car seat.

A system comprising the rocker and car seat may be modeled as analogous to an inverted swing for purposes of calculating timing for motion of the rocker. Monitoring sensors coupled to the rocker using a processor, and applying filters to sensor data, may be used to determine amplitude and phase of the car seat while rocking. Artificial Intelligence (AI) may be used to train the system timing for optimum amplitude of the motion and adjusting the timing for perturbations of the system resonance due to motion of an occupant of the car seat or changes in external forces on the car seat. The sensors may be monitored and the filters may be applied to sensor data to determine or predict an angular phase and amplitude of the rocker and car seat in real time. The timing and motion of inertial mass of the rocker may be adjusted to achieve a motion of the car seat that emulates motion of the car seat in a car. Additional signals may be summed into the timing and motion to generate noise signals that emulate motion of a car, or to generate sounds using a servo actuator or speaker and sync the sounds to the induced motion of the car seat.

In one embodiment, a system comprises a car seat, a rocker including an inertial mass and actuator assembly, and a smart device such as an iPhone, iPad, Android, or tablet. The rocker and smart device are in wireless communication, and the system is configured to induce rocking motion of the car seat. The smart device may be placed in the car seat along with the occupant. The smart device may use motion and position sensors integrated into the device for estimating acceleration, motion, angular phase, and amplitude of the car seat in real time. The wireless communications between the smart device and rocker may be used for driving the inertial mass using the actuator assembly and monitoring status of the rocker including the actuator assembly. Processing for controlling the actuator assembly may be distributed between the rocker, actuator assembly, and smart device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
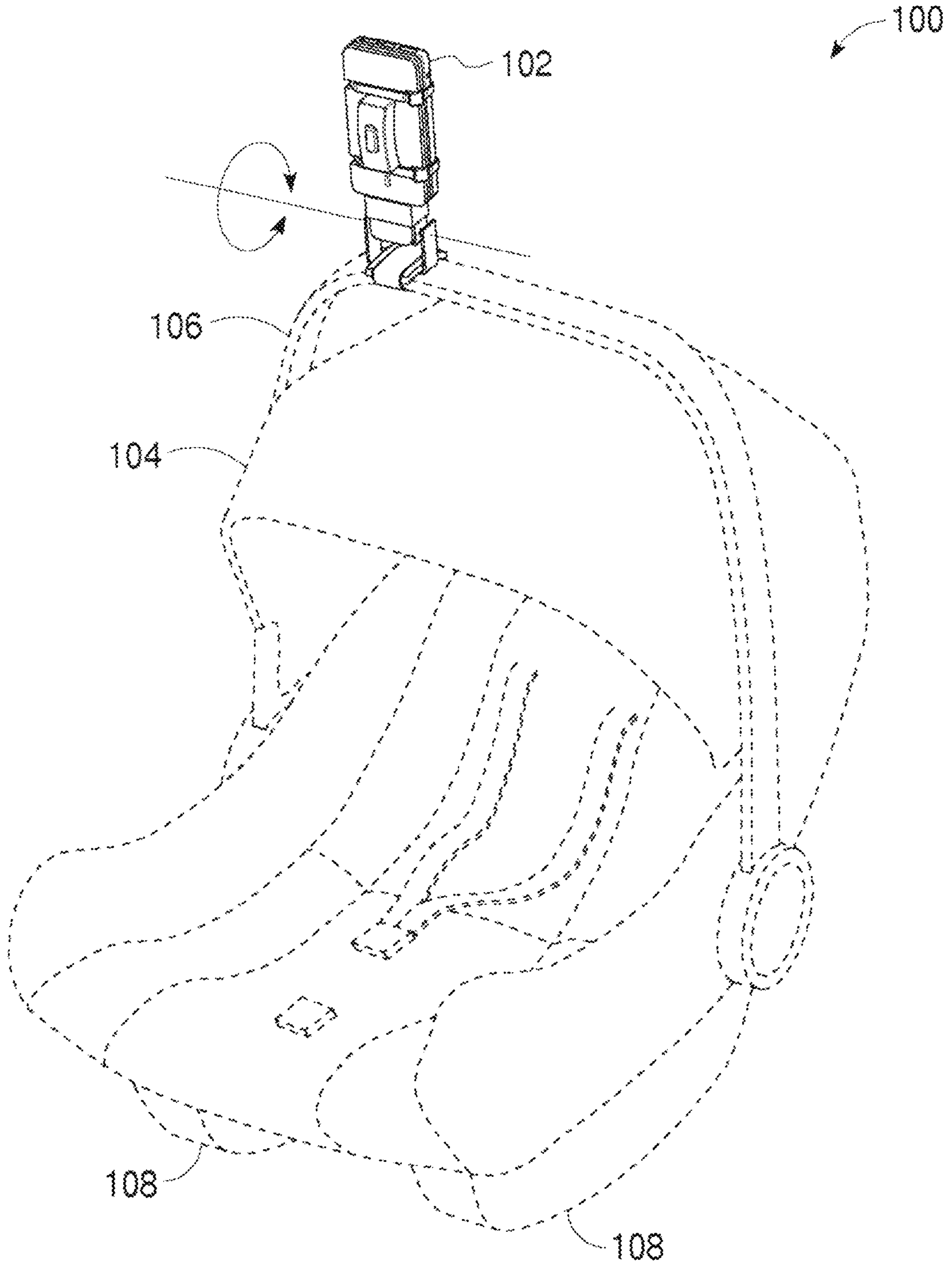
FIG. 1 is a perspective view of a rocking system comprising a rocker attached to a car seat in accordance with various aspects of the claimed technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

These and other advantages of the present technology are provided in greater detail with reference to the drawings.

FIG. 1 is a perspective view of a rocking system 100 comprising a rocker 102 attached to a car seat 104 in accordance with various aspects of the claimed technology. The rocker 102 is of FIG. 1 secured to a handle 106 of the car seat 104. The car seat 104 of FIG. 1 includes bottom rails 108 that are generally curved for positioning in a car and also permit rocking of the car seat 104 inside or outside of the car. The car seat 104 is shown for illustration purposes and forms a part of the environment in which the rocker 102 operates, but may not be a part of the claimed technology.

Figure 2:
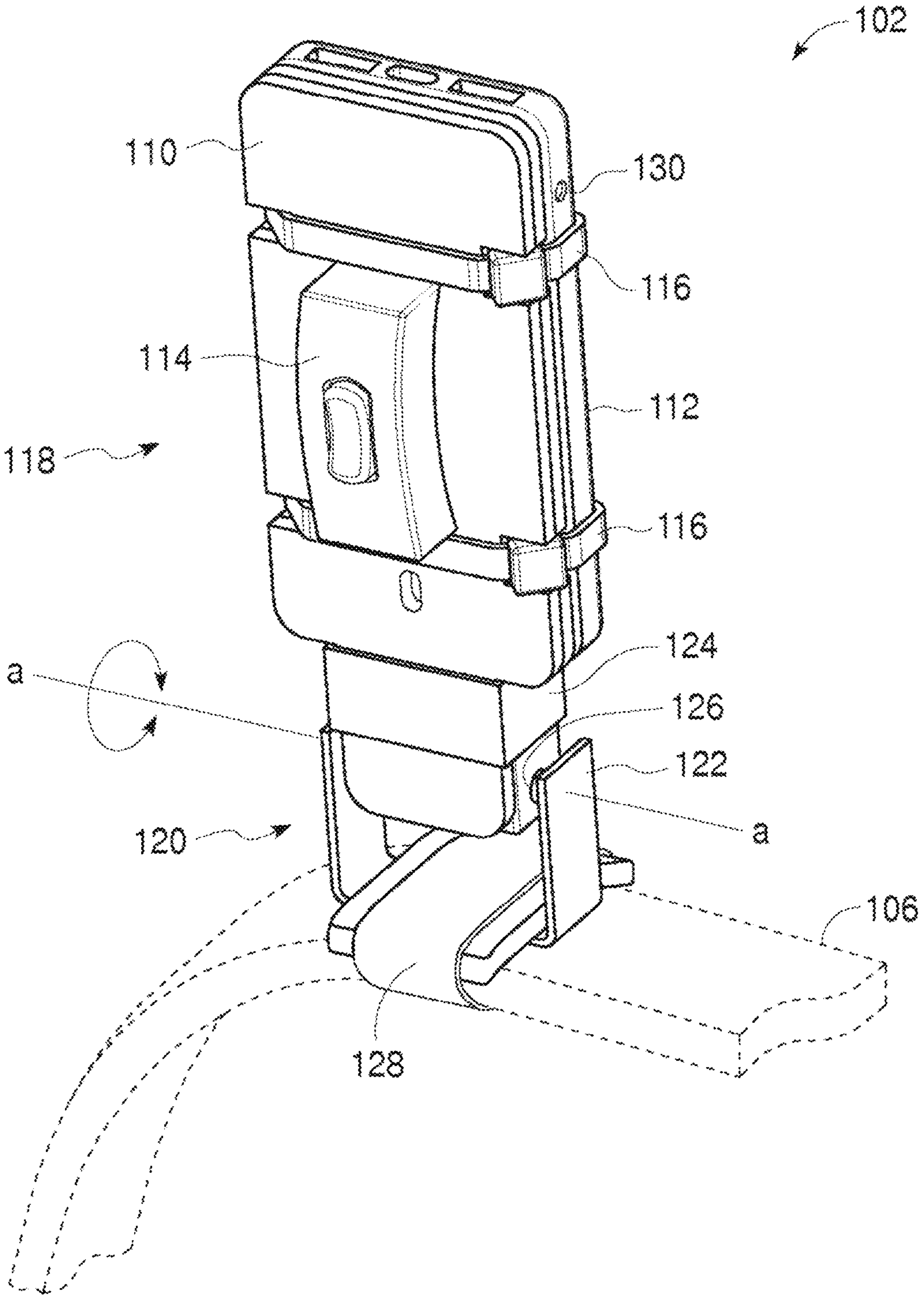
FIG. 2 is a perspective view illustrating details of FIG. 1 including the rocker and a portion of the handle of the car seat.

FIG. 2 is a perspective view illustrating details of FIG. 1 including the rocker 102 and a portion of the handle 106 of the car seat 104. The rocker 102 includes an inertial mass 118, an actuator assembly 120, and a clamp assembly 128.

Figure 3:
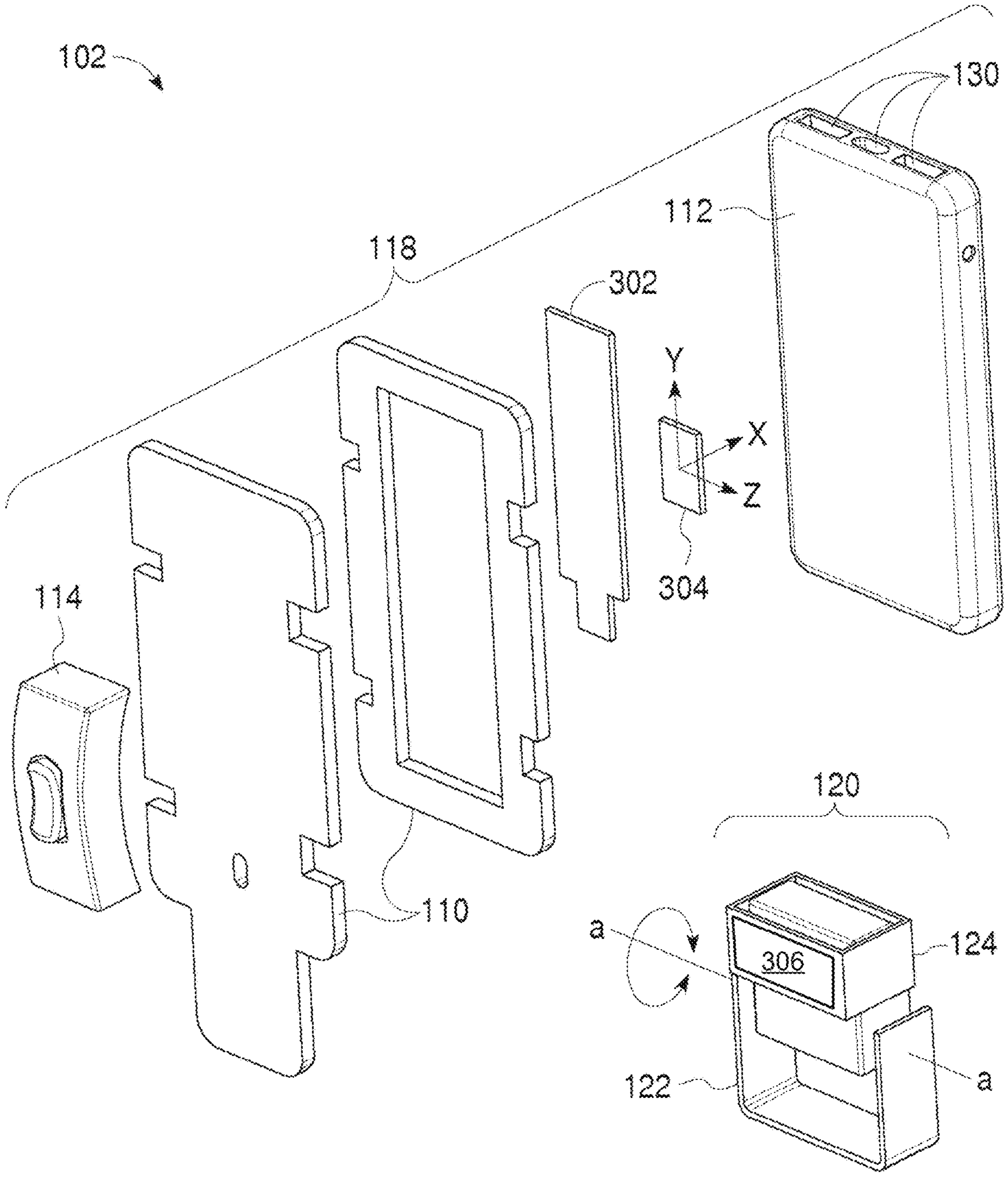
FIG. 3 is an exploded diagram of the rocker of FIG. 2.
Figure 4:
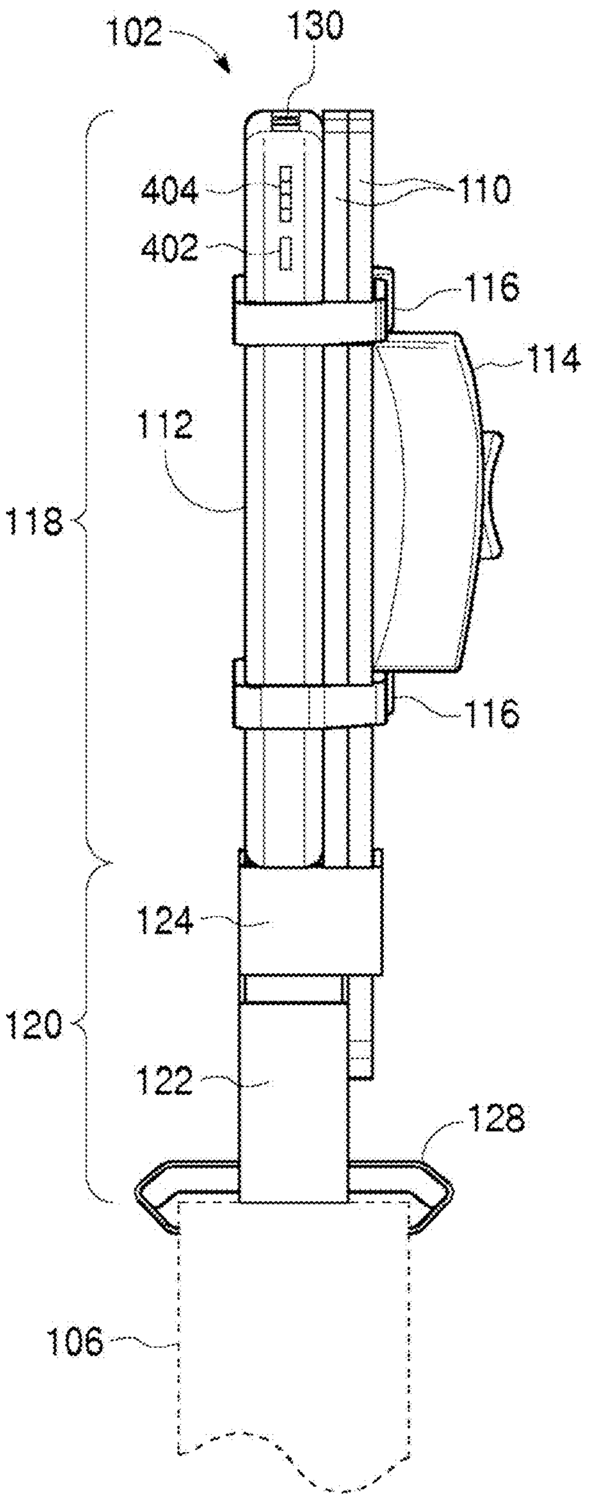
FIG. 4 is a left, side elevation view of the rocker of FIG. 2.
Figure 5:
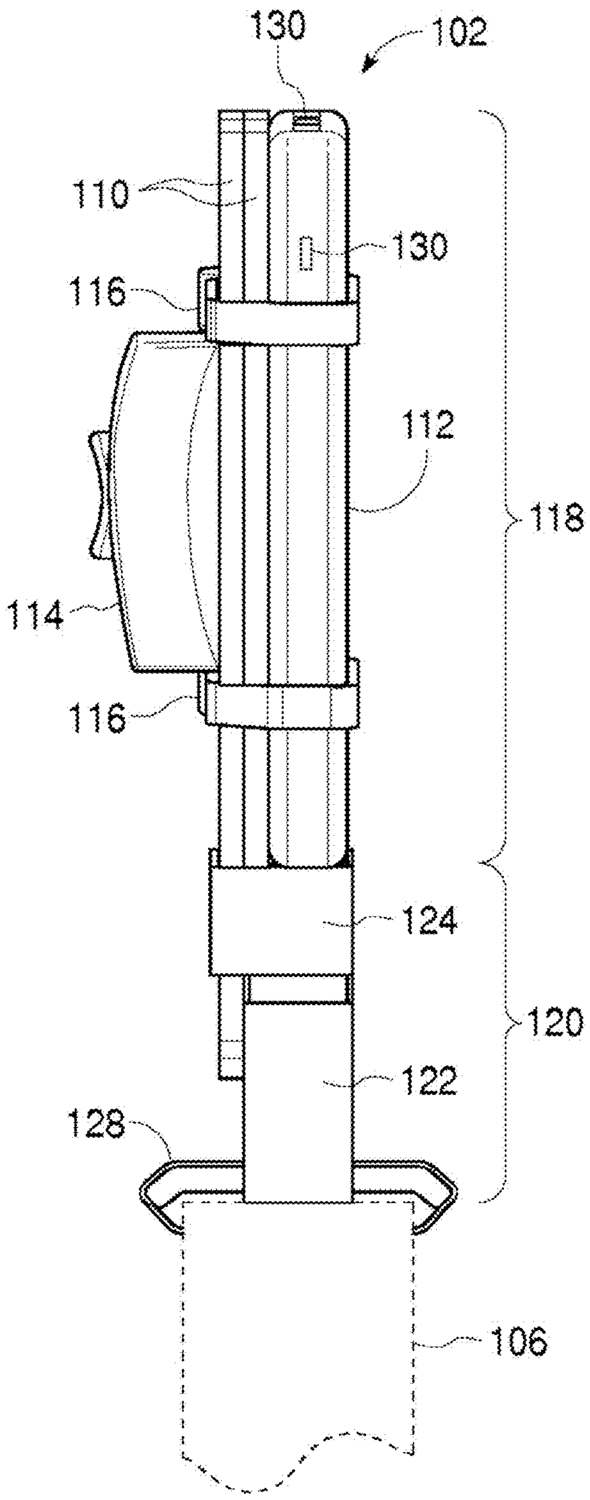
FIG. 5 is a right, side elevation view of the rocker of FIG. 2.
Figure 6:
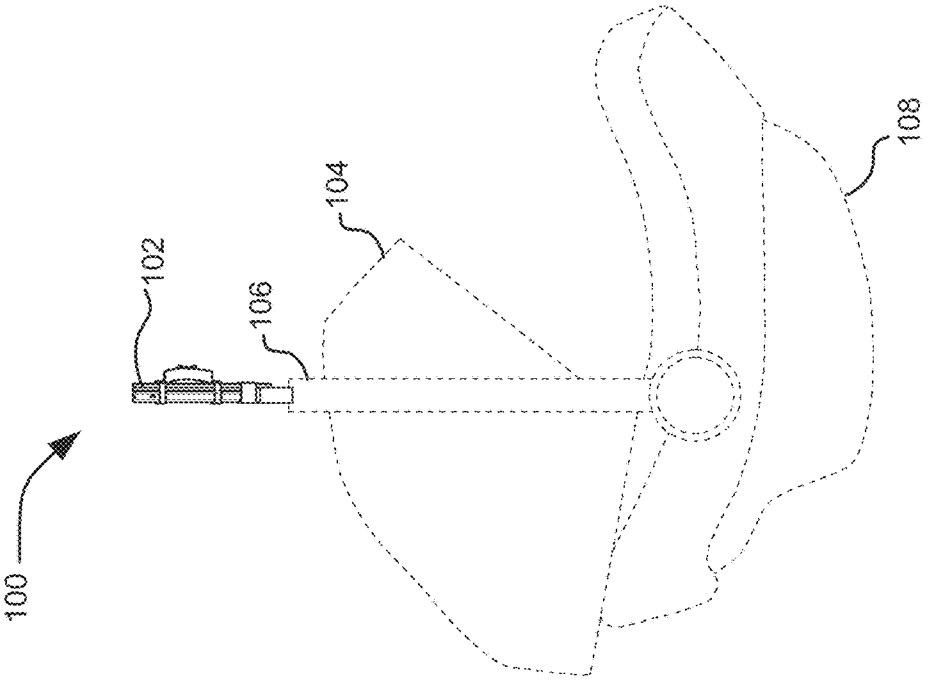
FIG. 6 is a left, side elevation view of the rocking system of FIG. 1.
Figure 7:
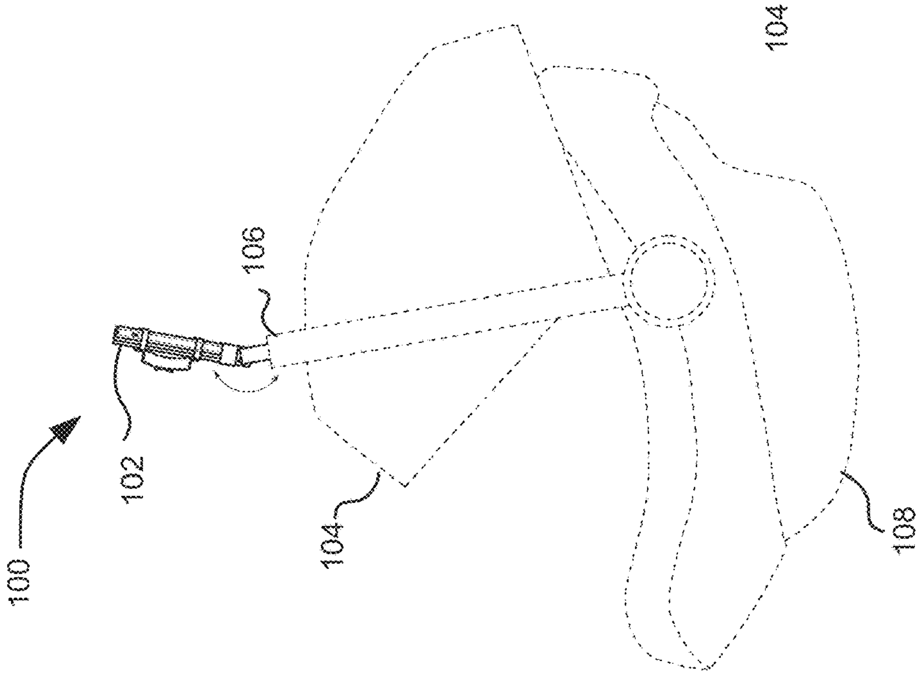
FIG. 7 is a right, side elevation view of the rocking system of FIG. 1.
Figure 8:
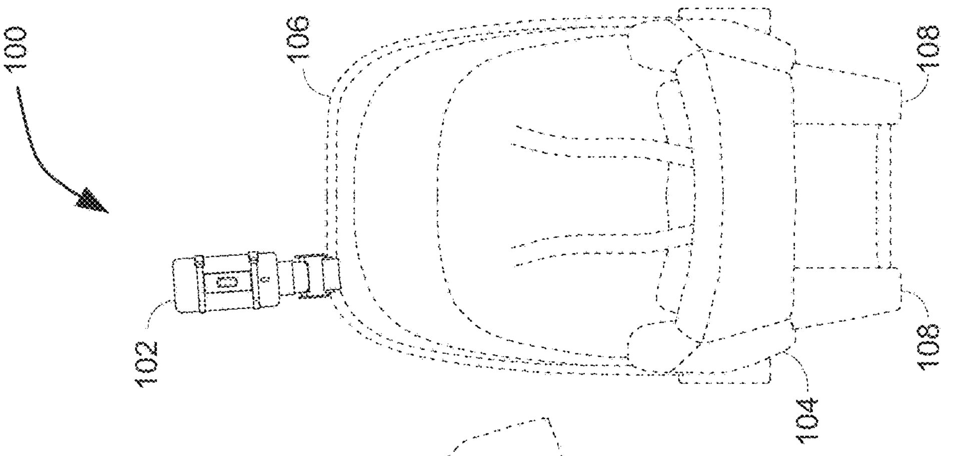
FIG. 8 is a front, elevation view of the rocking system of FIG. 1.

FIG. 3 is an exploded diagram of the rocker 102 of FIG. 2. FIG. 4 is a left, side elevation view of the rocker 102 of FIG. 2. FIG. 5 is a right, side elevation view of the rocker 102 of FIG. 2. FIG. 6 is a left, side elevation view of the rocking system 100 of FIG. 1. FIG. 7 is a right, side elevation view of the rocking system 100 of FIG. 1. FIG. 8 is a front elevation view of the rocking system 100 of FIG. 1.

The inertial mass 118 of FIG. 2 includes a housing or case 110, a battery 112, and a switch assembly 114. The housing 110 is configured to support a processor assembly 302 and a sensor 304, as illustrated in FIG. 3. The battery 112 is configured to contribute inertial mass to the rocker 102 and provide power to the processor assembly 302 and sensor 304. The battery 112 includes USB ports 130. Examples of USB ports 130 include USB A, B, and C ports, micro USB ports and/or the like. The USB ports 130 may be used for charging the battery 112 and accessing power from the battery 112. For example, a USB port 402 (illustrated in FIG. 4) may be used for charging the battery 112. The battery 112 also include a status LED array 404 (illustrated in FIG. 4), e.g., for indicating active charging, level of charge of the battery 112. The rocker 102 of FIG. 2 also includes rocker securing straps 116 for securing the case 110, battery 112, processor assembly 302 and sensor 304 together.

The actuator assembly 120 includes an actuation armature 122. The actuation armature 122 of FIG. 2 is configured in a "U arm" shape for securing to the handle 106 of the car seat 104 using the clamp assembly 128. The clamp assembly 128 and actuation armature 122 of FIG. 2 are configured for mounting the rocker 102 to the handle 106 without using tools. This tool-less mounting system allows the rocker 102 to be mounted to the car seat 104 in such a way that if the clamp assembly 128 should fall, the rocker 102 will not impact a baby or infant (not illustrated) in the car seat 104. At the same time, the tool-less mounting system of the clamp assembly 128 may be configured for quick release, while still effective at securing the rocker 102 to the handle 106 for rocking the car seat 104 and baby. The clamp assembly 128 illustrated in FIG. 2 uses an "around the handle" mount to the actuation armature 122 on the actuator assembly 120. Examples of the clamp assembly 128 include strap mounts, handlebar mounts, GoPro camera mounts, Action camera mounts, Hose Clamps, zip ties, media mounts for professional stage lighting, and/or the like.

The actuator assembly 120 of FIG. 2 further includes actuator motor assembly 124 that is attached to the inertial mass 118 and electrically coupled to the processor assembly 302. In some embodiments, the actuator assembly 120 and/or motor assembly 124 is electronically coupled to the processor assembly 302 via a wireless module 306 configured to send and receive drive signals wirelessly to and from the processor assembly 302. Examples of drive signals include drive commands, position commands, acceleration commands, motor drive commands, angle commands, and/or the like to the actuator assembly 120. Additional examples of drive signals include position, current, voltage, angle, acceleration, motor assembly status, and/or the like from the actuator assembly 120. The wireless module 306 includes wireless capabilities such as Wifi, BLE, Zigbee, and/or the like.

The actuator motor assembly 124 may be further coupled to actuation armature 122 via a bearing 126 that may form an articulating joint. The actuator assembly 120 is configured to rotate the actuator motor assembly 124 and attached housing 110 relative the actuation armature 122 about an axis (line a-a) through the bearing 126. Means for rotating the actuator motor assembly 124 (rotation means, drive means, etc.) include a rotary actuator, servo motor, stepper, solenoid, speaker (properly oriented), linear actuator, piezo, linear motor, bi-stable solenoid (linear, rotary), solenoid, self-restoring 3 position solenoid (linear, rotary), and/or the like. An embodiment of the motor servo unit of the actuator motor assembly 124 includes a 20 kilo cycle motor servo unit, which uses a 5 volt brushed motor, gear head encoder, and PID control. Input to the actuator motor assembly 124 may include TTL PWM 50 hz. 1.0 ms=center. 0.5 ms=−135 degrees. 1.5 ms=+135 degrees.

The processor assembly 302 of FIG. 3 includes a circuit board, microprocessor mounted on the circuit board along with peripheral devices such as, drivers, buffers, and amplifiers. The sensor 304 may be electrically coupled to the processor assembly 302. In some embodiments the sensor 304 is integrated into the processor assembly 302. The processor assembly of FIG. is further electrically coupled to the actuator assembly 120 and configured to drive and/or control rotation and/or position of the actuator motor assembly 124. The processor assembly 302, sensor 304, and/or any of the peripheral devices may be integrated into a single device. The single device may be mounted on a circuit board or directly to the case 110 or actuator assembly 120. A wireless module 306 may be similarly integrated into the processor assembly 302 for wireless communication with the actuator assembly 120.

The sensor 304 of FIG. 3 is a six axis device configured to detect motion data, including acceleration in X, Y, and Z, and rotation about the X, Y, and Z axes. However data in more or fewer axes may be detected. In various embodiments, the processor assembly 302 is used for receiving detected motion data from the sensor 304, calculating position and acceleration, filtering the data, predicting phase alignment, performing artificial intelligence (AI) on the data, and/or driving the actuator assembly 120.

While the rocker 102 of FIG. 2 is illustrated as using straps 116 for securing the housing 110 to the battery 112, the housing 110 and battery 112 may be secured using various means including glue buckles, snaps, cam-locks, tie wraps, pipe clamps, screws, rivets, and/or the like. In some embodiments, the housing 110 includes a chamber for accommodating the battery 112.

In various embodiments, battery types for the battery 112 include Zinc-carbon, Zinc chloride, alkaline, oxy nickel hydroxide, lithium-iron disulfide, lithium-manganese dioxide, Mercury oxide, Zinc-air, Silver oxide, NiCd, Lead Acid, NiMH, Lithium ion, Lithium Cobalt Oxide, Lithium Iron Phosphate, Lithium Nickel Manganese, Lithium Manganese Oxide, Lithium Titanate ($Li2TiO3$), and/or the like. The battery 112 of FIG. 2 is a 10 amp hour LiPo battery with a boost regulator and a USB charge circuit. It can output 5 volts at 2.1 amps. The battery 112 may be charged using a 5 volt, 2.1 amp source.

The switch assembly 114 may be electrically coupled to the processor assembly 302 and used for turning on and off the rocker 102, as well as disabling or shutting down the rocker 102. In some embodiments, the switch 114 may be configured with multiple positions for providing communication to the processor assembly 302 and to facilitate controlling aspects of the rocker 102, such as amplitude, wave form, delay, and/or the like. In various embodiments, the switch assembly 114 includes a single pole single throw switch, multiple pole switch, multiple throw switch, push button switch, momentary on or off switch, an array of switches, and or the like.

Figure 9:
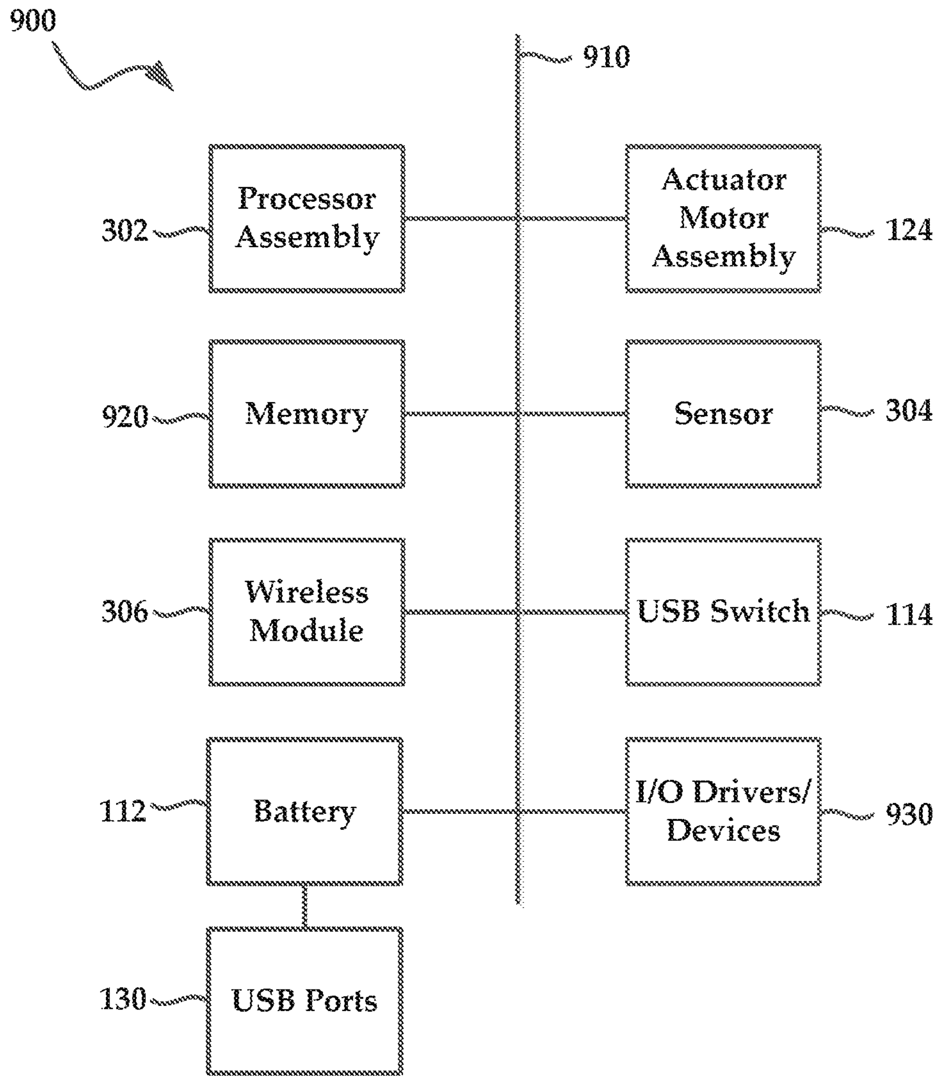
FIG. 9 is a block diagram illustrating electronic components of the rocker of FIG. 2 and FIG. 3 and an interconnection of the electronic components.

FIG. 9 is a block diagram illustrating electronic components of the rocker 102 and an interconnection 900 of the electronic components. The processor assembly 302 of FIG. 9 is illustrated as being electrically coupled via a bus 910 to the actuator motor assembly 124, sensor 304, switch assembly 114, and battery 112, as discussed elsewhere herein. In addition, the processor assembly 302 is electrically coupled to memory 920, input/output (I/O) drivers 930, and wireless module 306.

Examples of microprocessors for the processor assembly 302 include microprocessors having 10 MIPS processing power or more; stable clock or external crystal integration; 16 bit processing; built in flash memory; built in SRAM; and I2C hardware acceleration or GPIO with software capabilities so that an I2C Master can be "bit banged" if a hardware I2C interface is not available. In some embodiments, the processor assembly 302 is integrated with a wireless module 306 having wireless capabilities including Wifi, BLE, Zigbee, and/or the like. Various components of the processor assembly 302 (e.g., memory 920, sensor 304, wireless module 306, and I/O drivers 930) may be integrated into a single device or implemented as separate devices electrically coupled to the processor assembly 302 via the bus 910.

The memory 920 of FIG. 9 includes 64 kB of flash, 1 kB of SRAM. Additional types of memory 920 include RAM, PROM, EPROM, FLASHEPROM, and/or the like. The memory 920 stores, in part, instructions and data for execution by processor assembly 302. The memory 920 may store the executable code when in operation.

The components shown in FIG. 9 are depicted as being connected via a bus 910. The components may be connected through one or more data transport means. The processor assembly 302, sensor 304, I/O drivers 930 actuator motor assembly 124, and memory 920 may be connected via a local microprocessor bus. In some embodiments, the actuator motor assembly 124 is connected to the processor assembly 302 via the I/O driver 930.

In some embodiments, the components of FIG. 9 are distributed between the rocker 102 and a smart device. Examples of smart devices include smart phones, pads, tablets, smart watches, and/or the like, which integrate the processing power of processor 302, the capability of sensor 304, and wireless communications of a wireless module 306. Various components of the interconnection 900 may be found on the rocker 102 on a smart device, or distributed on the rocker 102 and the smart device. The bus 910 may include wireless communication, e.g. using wireless modules 306, for handling communication between the rocker 102 and smart device.

The switch 114 may serve as a user input device and provide a portion of a user interface. The switch 114 may include an alphanumeric keypad, such as a keyboard, for inputting alpha-numeric and other information, Additional user input devices may comprise, but are not limited to, devices such as audio microphones, speech recognition systems, facial recognition systems, motion-based input systems, gesture-based systems, applications implemented on smart phones, tablets, capacitive touch screens, and so forth.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

In operation, the system 100 may be modeled as an inertially driven, inverted swing. Swings are well understood at an intuitive level by children of all ages including adults. However the actual mechanism for pumping a swing into oscillation and maintaining the oscillation of the swing is not always readily apparent. A swing is essentially an oscillating pendulum. There are several basic models or ways for describing a swing and the oscillation of the pendulum. The first model represents a swing as an externally driven oscillation. An external force is applied roughly tangentially to the rotation of the swing or pendulum. An example is a parent standing behind a swing and pushing their child periodically at about the resonant frequency of the swing. This is analogous to a car seat pusher that is attached to a rail 108 of the car seat 104 and pushes against a surface such as a floor or wall to rock the car seat.

The second model is a parametric oscillation representation of a swing. The length or center of mass of the pendulum is changed in time with resonance of the swing. Another way of describing this is the vertical center of mass of the pendulum is changed. An example is a child standing on the seat and then moving up and down along the axis of the ropes. The maximum effective point for pumping the swing using a vertical change in mass is at about the center of the arc of the swing. The minimum is at the ends of the arc.

The third model represents the swing as an inertially driven oscillation. A rotation of a mass suspend from the swing applies a "kick" or impulse to the swing. An example is a child standing or sitting on the seat of the swing and rotating her body by leaning forward or backward without changing the vertical center of mass. The maximum effective point for pumping the swing using a rotation to inertially drive the swing is at the ends of the swing's arc. The minimum effect is at the center of the arc.

As a practical matter a combination of both parametric and inertially driven oscillation are generally used in the playground to pump swings. An example is when a child sitting on the seat changes both the vertical center of mass and rotates her body by a combination of leaning and extending the legs forwards and backwards while gripping and bending the ropes. Children quickly learn how to intuitively time the leaning and swinging of legs to efficiently pump a swing higher and higher.

However, a swing differs from the rocker system 100 in that a swing generally uses flexible ropes or chains, whereas the rocking system 100 uses stiff members including the handle 106. Also the inertial mass of the swing is below the point of rotation of the pendulum, whereas the inertial mass 118 of the rocking system 100 is above the point of rotation, which is a virtual point above or below the rails 108, depending on the radius of the rails 108.

Figure 10A:
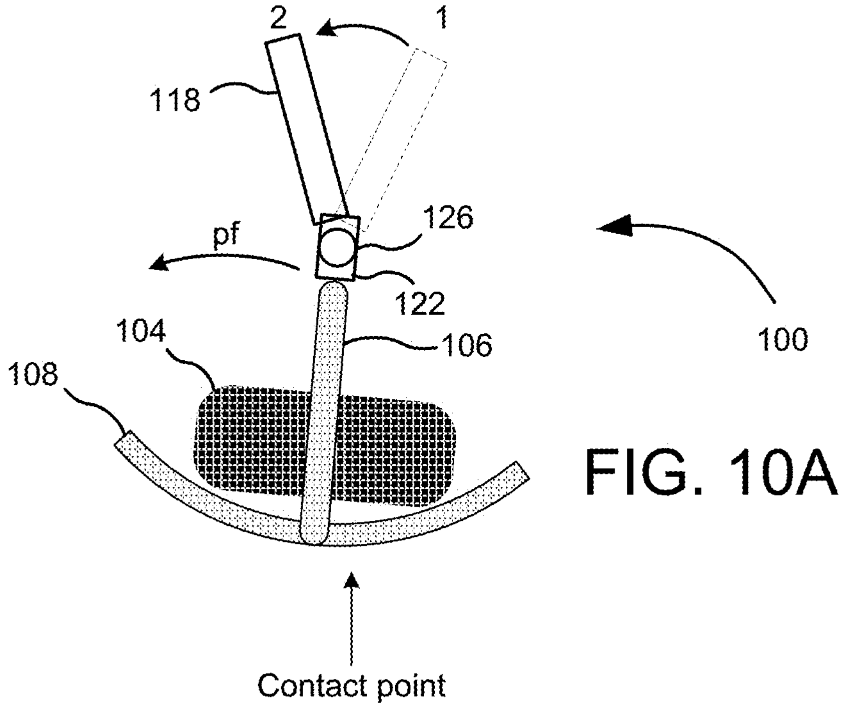
FIG. 10A and FIG. 10B are block diagrams of the system of FIG. 1 illustrating inertial pumping.
Figure 10B:
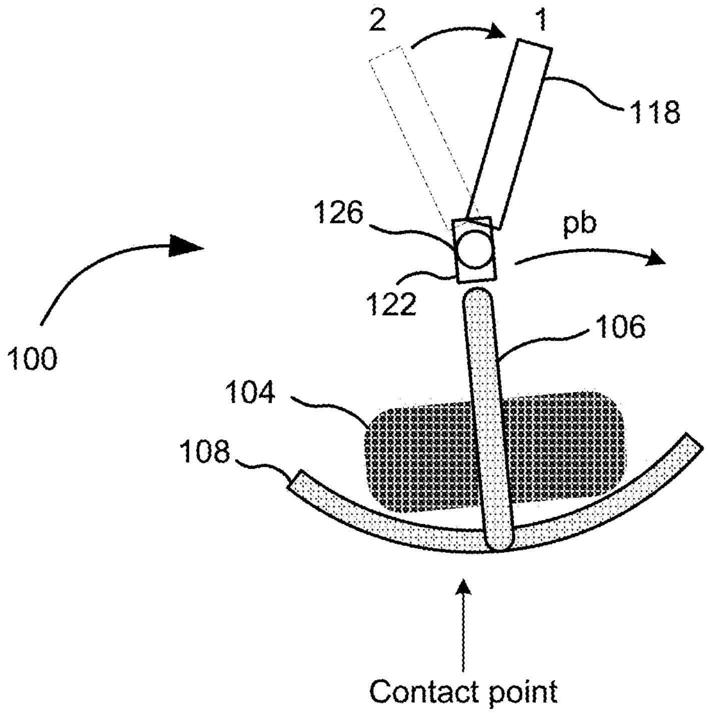

FIG. 10A and FIG. 10B are block diagrams of the system 100 of FIG. 1 illustrating inertial pumping. These block diagrams may be further understood in the context of FIG. 11 and FIG. 12 in the context of the description of FIG. 11 and FIG. 12 as set forth elsewhere herein.

The inertial pumping uses the rotation of the inertial mass 118 about the axis a-a through the bearing 126. In the case of the rocker 102, the actuation armature 122 is rigidly affixed to the handle 106 of the car seat 104. The inertial mass 118 may be rotated to apply a "kick" or impulse or acceleration used to the pump the system 100 into oscillation and maintain the oscillation. The impulse or acceleration from the kick provided by rotation of the inertial mass serves to pump the car seat 104 without applying any force to objects other than the car seat 104 and inertial mass 118.

In FIG. 10A, the car seat 104 is near the end of the counterclockwise rotation, or the maximum point of a clockwise rotation of the system 100 to the right. The rails 108 are supported at the contact point and the center of mass is to the left of the contact point. This urges the system 100 to rotate counter clockwise to the left as indicated by arrow pf. Near this point of maximum clockwise rotation, the inertial mass 118 may be rotated from position 1 to position 2. This applies a kick inducing a counterclockwise rotation of the system 100 in the counterclockwise direction (arrow pf). The rails 108 contribute torque on the system 100 in the counterclockwise direction due to gravity. The system 100 continues to rotate counter clockwise through the center of rotation, which may be characterized as the center of mass of the system 100 being directly over the center of support of the rails 108. Upon passing through the center of rotation, the rails 108 begins applying a clockwise torque on the system 100. The clockwise torque from the rails 108 retards to counterclockwise rotation of the system 100 until reaching the end of the counterclockwise rotation or maximum counterclockwise rotation at FIG. 10B.

In FIG. 10B the rails 108 are supported at a contact point that is to the left of the center of mass; the center of mass is now to the right of the contact point. This urges the system 100 to rotate clockwise to the right as indicated by arrow pb. Near this point of maximum counter clockwise rotation, the inertial mass 118 may rotate from position 2 to position 1. This applies a kick inducing a clockwise rotation of the system 100 in the clockwise direction (arrow pb). The rails 108 contribute torque on the system 100 in the clockwise direction due to gravity. The rails 108 continue applying clockwise rotation and the inertial mass 118 may then be rotated counterclockwise from position 2 to position 1. The kick from the inertial mass 118 also applies a clockwise torque on the system 100 that is added to the clockwise torque applied by the rails 108. The system 100 then begins to rotate clockwise either from the clockwise kick applied by the inertial mass 118, the clockwise torque contributed by the rails 108, or both. The system 100 continues clockwise rotation through the center of rotation as the clockwise torque from the rails 108 diminishes and then transitions to a counterclockwise torque at the center of rotation. The system 100 continues on against counter clockwise torque from the rails 108 until reaching the end of the clockwise rotation at FIG. 10A. Then the cycle is repeated with rotation of the inertial mass 118 from position 1 to position 2.

The rotation of the inertial mass 118 from position 1 to 2 in FIG. 10*a* provides an acceleration or kick for rotating the car seat 104 counter clockwise that may be applied a little before or after reaching the end of the system 100 clockwise rotation. Similarly, rotation of the inertial mass 118 from position 2 to 1 or kick for rotating the car seat 104 in the clockwise direction in FIG. 10B may be applied a little before or after reaching the end of the system 100 counterclockwise rotation. The timing of the kicks may be determined by the processor assembly 302 applying filters to data received from the sensor 304, as described elsewhere herein. The kick derived from rotating the inertial mass 118 from position 1 to 2 or from position 2 to 1 results in maintaining rocking of the car seat 104 without push against any object adjacent to the car seat 104 or outside of the system 100.

In the course of developing the claimed technology, various candidates for the inertial mass 118 were considered including pieces of steel, iron, nickel, etc. An unexpected result was found through experimental determination that a lithium polymer battery has a density roughly equivalent to steel. A measurement of the system 100 including drive electronics mounted to an inertial drive mass may adequately characterize the angular inertia and phase of the system 100. Since the battery 112 that is powering the electronics has a mass that is about equivalent to other types of inertial masses, it is heavy enough to indirectly "swing" the car seat 104, and system 100. Making use of the battery 112 as the inertial mass 118 is a serendipitous solution to what would have otherwise been the general problem addressed in all battery powered systems, i.e., where to put a battery. Batteries are usually just considered to be extra bulk that has to be put somewhere that is out of the way. Thus, locating batteries generally poses a problem, rather than providing a useful solution for supplying major mechanical components of a system. As it turns out, the other components secured to the battery 112 also contribute to the inertial mass 118.

During the course of developing the claimed technology there was a choice between mechanically coupling the sensor 304 directly to the car seat 104, for example via the actuation armature 122, or indirectly to the car seat 104, e.g., via the inertial mass 118 (battery 112), housing 110, etc. While both the direct and indirect embodiments are feasible, it was determined that each embodiment presents different problems and solutions. Direct coupling of the sensor 304 to the car seat 104 simplifies the computations at the cost of additional wiring and mechanical connections. Indirect coupling of the sensor 304 to the car seat 104 simplifies the wiring and mechanical attachments at the cost of complicating computations. In other words, mounting the inertial mass 118 to the sensor 304 via the case 110 poses an unexpected problem for the measurement of the intended swing effect. An alternative embodiment would have been to mount the sensor 304 on the car seat 104 side of the bearing 126, which would involve additional wiring and mechanical problems.

Position 1 and position 2 of FIG. 10A and FIG. 10B may be may be constrained by the mechanical limits of rotation of the inertial mass 118 about the bearing 126. However, in some embodiments position 1 and/or position 2 may be selected within those mechanical limits based on amplitude of rocking of the car seat 104, velocity of the car seat 104, acceleration, phase alignment, and/or the like. For example, a motor, gear head encoder, and PID controller assembly may be used to slew the inertial mass 118 through an arbitrary angle or between arbitrarily selected position 1 and position 2. Any of position 1, position 2, and an angle between them may be selected in real time by the processor in response to amplitude, velocity, acceleration and/or phase of the rocking of the car seat 104. Similarly a servo motor may be used to dive the inertial mass 118 through an angle between position 1 and position 2, any or all of which may be selected in real time.

In the present embodiment of the rocker 102, the rotation of the inertial mass 118 is driven by a square wave applied to the actuator motor assembly 124. The rising and falling edges of the square wave provide an impulse or kick to move the actuator motor assembly 124 to an angle relative the armature 122. The angle may be a function of the amplitude of the square wave that corresponds to position 1 or position 2. The actuator motor assembly 124 may be held at the position 1 or 2 using standard servo techniques. However more generally, various embodiments of the signal used to drive the rotation of the inertial mass 118 may be characterized as square wave, sinusoidal wave, triangular wave, impulse, spike, and/or the like. In some embodiments, other wave forms such as white noise, pink noise, a mother's heart beat, music, and/or the like are modulated over the signal used to drive the rotation of the inertial mass 118, thus, adjusting the time of the signal driving the inertial mass.

Experimental observations of the various wave forms indicate that infants in the observed sample respond best to the square wave. It is possible that the slight tap or impulse from the square emulates a heartbeat or gentle pat from a hand.

For the indirect coupling embodiment, the sensor 304 can be mounted in the processor assembly 302, on a circuit board as part of the processor assembly 302, or integrated into a microprocessor that is the processor assembly 302. The processor assembly 302 may apply various filters to data from the sensor 304 in order to filter out drive motion of the sensor 304 relative the car seat 104, and to detect overall "swing" motion of the car seat 104. Filters may also be applied to the sensor data to predict a phase alignment of the car seat. A robotic arm model of the rocker 102 and system 100 may be used to filter out the motion of the inertial mass 118 that was an input to the rocker system 100. This complicates the artificial intelligence. However, the system 100 may be modeled as a second order differential equation that does converge to a resonant frequency of the system 100.

In some embodiments, the overall motion of the system 100 including the car seat 104 and rocker 102 are calculated in real time using sensor 304 data and servo data applied to the actuator motor assembly 124. The absolute position of the inertial mass 118 may be detected from the sensor 304. Also knowledge of the relative position of the inertial mass 118 with respect to the car seat 104 may be derived from the drive applied to servo motor and feedback from the servo motor encoder. The position of the car seat 104 may then be calculated in real-time from the detected absolute position and derived relative position. And phase alignment of the car seat 104 may be predicted in real time from the position of the car seat 104. This may be further simplified when the actuator motor assembly 124 places the inertial mass 118 in only one of two different positions. In some embodiments, the transition between the two positions may be simplified to near instantaneous for purposes of calculating when to apply an impulse or kick to drive the system 100 in first one direction then the other as illustrated and described in FIG. 10.

In some embodiments, computationally simplified models and methods of convergence may be used to emulate various aspects of parental and/or car. Thus, for purposes of simplification, response of the actuator may be modeled as nearly instantaneous. Other models of the actuator response may be modeled as having a certain characteristic motion that is around a certain amount of time, e.g., 200 ms. While microcontrollers have power to model the system 100 with considerably more accuracy, in the course of developing the claimed technology it has been observed experimentally that the result is virtually indistinguishable to visual inspection. More importantly, the effect on the baby remains about the same. Thus, in some embodiments, the transition time between positions 1 and 2 may be approximated as being zero in comparison to the period of the car seat motion.

An unexpected problem that arose in the course of developing the claimed technology, was encountered when the occupant of the car seat 104 such as a baby or infant, shifted her weight, which in turn shifted the resonant frequency of the system 100. The model of the system 100 may be selected to include sufficient bandwidth in the state estimation for the sensitivity gradient to still converge to appropriate resonant frequency and phase change corrections. A solution may be to use a "phase aligned" or "phase locked" loop based model of resonance.

Another unexpected problem that arose in the course of developing the claimed technology, was selecting initial conditions for an Artificial Intelligence model. The problem that was encountered was that AI models generally need to start somewhere. Without some sort of initial state for the system 100, using math to estimate the ultimate resonant phase and frequency becomes problematic. The solution that was developed after substantial experimentation was unexpectedly simple, i.e., make a guess as to what the frequency and phase is most likely to be based upon a median weight distribution of a baby in a median shaped car seat. It was further discovered that surprisingly this guess can fall within a substantially broad range for which the AI can still converge relatively quickly to a phase locked resonance (or "near resonance"). Experimentation further revealed that the Q of a car seat for the rocker 102 is not so sharp. Instead, the Q is broad enough that a difference of a few hz or few degrees phase will not stop rocking entirely. Thus, an initial condition of 85 hz is adequate for use as an initial condition. Further, experiments show that babies and infants seem to respond better when the system 100 is actually slightly "sub resonant," which can be characterized as converging to a frequency that is not exactly at resonance but instead is slightly below resonance. Fortunately, a slight sub resonant state still preserves the efficiencies of using the resonant frequency.

Yet another unexpected problem that arose in the course of developing the claimed technology involved recovery from a position shift by the occupant that is large enough to exceed the estimation and convergence bandwidth of the AI: A baby or infant can shift her weight substantially. Also a parent can pick up the car seat 104 in a way that manually stops it from rocking. This presented an unexpectedly difficult problem for rocker 102. Again, a solution was developed through extensive experimentation that turned out to be deceptively simple. This solution involves using a "maximum frequency" and "minimum frequency" as the highest and lowest respective frequencies that are likely to be resonant for a modern infant car seat. The minimum and maximum frequencies (minimum and maximum period) may be referred to as the expected range of the frequency or period. The result is to simplify the entire system 100 into a phase locked alignment.

The AI may monitor the sensor 304 to detect a phase alignment of the drive electronics to the underlying rocking motion. If the AI detects that an impulse signal is about to be applied earlier than consistent with the maximum frequency (before an end of the established minimum period or outside the expected range), then the AI waits until the minimum period is complete before sending the impulse signal to the motor/encoder system.

Similarly, if the AI has not detected an impulse signal after the maximum period has elapsed, which is outside the expected range, then the AI sends an impulse signal anyway. From a control system perspective the AI has moved its "right half plane zeros" into the "left half plane." This can also be described as forcing a system with marginal stability to become completely stable. Kind of a sneaky systems trick in its simplicity. . . . Thus, a simple set of boundary conditions or expected range of the maximum and/or minimum time period may be used to reduce or eliminate the occurrence of instability in real-time frequency and phase estimates and convergence to the resonant frequency or Fc.

Figure 11:
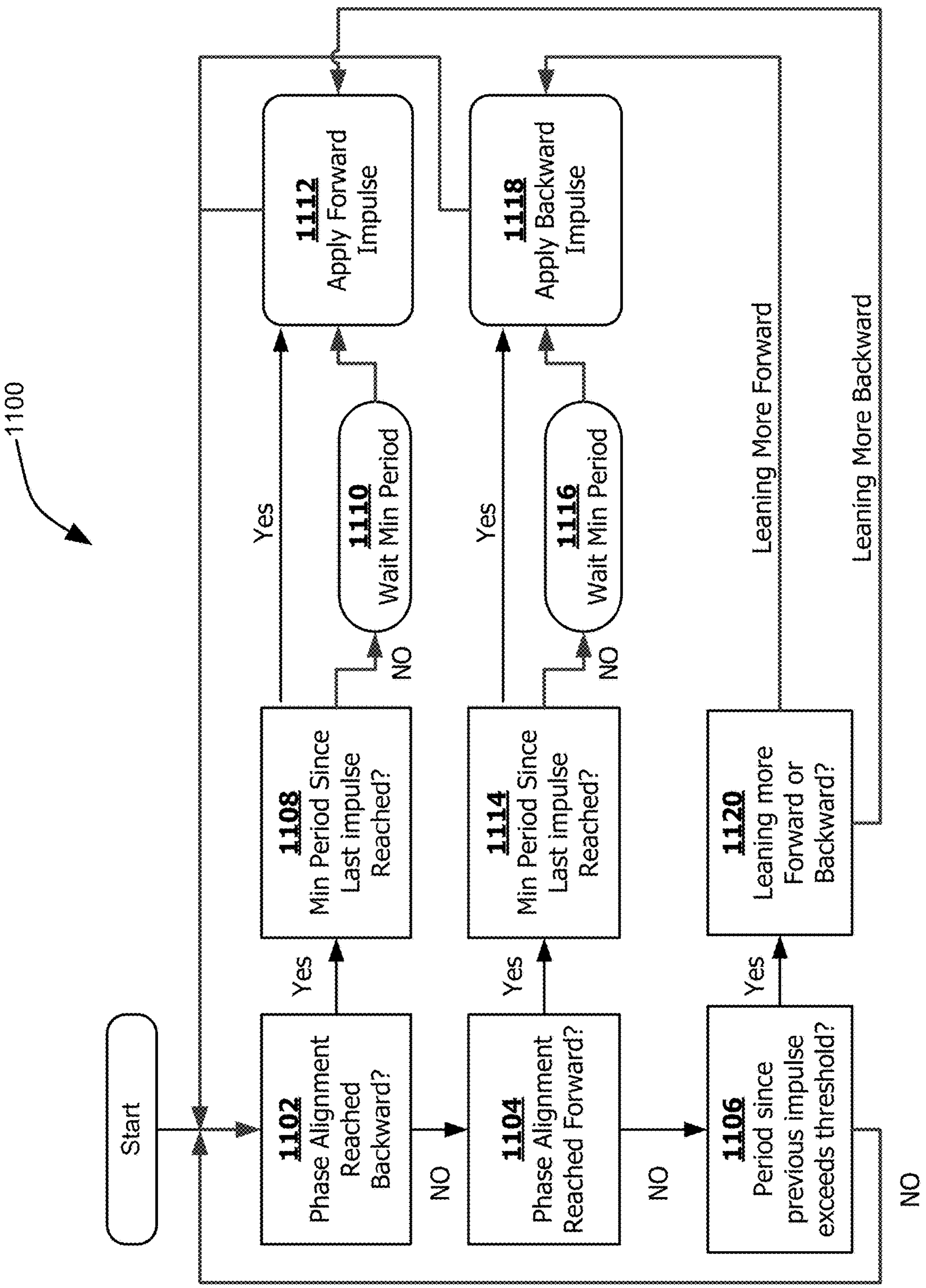
FIG. 11 is a flowchart of a method for driving the rocker.

FIG. 11 is a flowchart of a method 1100 for driving the rocker 102. For purposes of the method 1100, phase alignment is used to describe a condition during rocking where the system 100 has reached a position that is about end of travel and is turning around to rock the other way. This is illustrated in FIG. 10A and FIG. 10B. Phase alignment may be calculated and/or predicted using models and filters such as a Kalman filter. At the end of each clockwise or backward rock, the rocker 102 applies an impulse to "kick" the system 100 to drive it forward (counterclockwise). And at the end of the counterclockwise or forward rock, the rocker 102 kicks the system 100 to drive it backward (clockwise).

At step 1102, the processor assembly 302 determines if phase alignment is reached in the clockwise (backward) direction, or calculates a prediction of a time at which phase alignment is expected to be reached. This approximately corresponds to the position of the system 100 illustrated in FIG. 10A where the system 100 has rocked to the end of its backward travel. The processor assembly 302 may use a filter to determine the phase of the car seat from data from the sensor 304. In some embodiments the operations include operations involving kalman filtration and eigen vectors for detecting the phases. Also the operations include a model of the system 100 and the rocker 102 when the rocker 102 is moving itself within the moving reference "rocking frame", etc. . . . If phase alignment in the backward direction is reached, the method 1100 proceeds to step 1108. If phase alignment is not reached in the backward direction, the method 1100 proceeds to step 1104.

At step 1104, the processor assembly 302 determines if phase alignment is reached in the forward direction. This approximately corresponds to position of the system 100 illustrated in FIG. 10B where the system 100 has rocked the end of its forward travel. As in step 1102, the processor assembly 302 may use a filter to determine the phase of the car seat 104 from data from the sensor 304 and predict a phase alignment. Again the determination may include operations involving Kalman filtration and eigen vectors and a model of the system 100 and rocker 102 to predict a time at which phase alignment will be reached. If phase alignment in the forward direction is reached, the method 1100 proceeds to step 1114. If phase alignment is not reached in the forward direction, the method 1100 proceeds to step 1106.

At step 1106 the processor assembly 302 determines period (elapsed time) since a previous impulse and compares the period to a threshold. If the period exceeds the threshold in step 1106, the method 1100 proceeds to step 1120. Exceeding the threshold means the phase alignment determination has timed out and the system 100 has lost sync. Put another way, phase alignment is too late, thus, outside the expected range. It may be time to force an impulse. The step 1120 will be used to determine a direction for the impulse. Reasons for loss of sync and phase alignment occurring too late include a position shift of the occupant of the car seat 104, or an input from outside the system 100, such as somebody picking up the car seat 104 or moving it. If the period has not exceeded the threshold in step 1106, the method 1100 loops back to step 1102 to check again for phase alignment.

At step 1120 the system 100 recovers from a loss of sync condition. The system 100 has not reached phase alignment either forward or backward, which was indicated at step 1106 by exceeding the threshold for phase alignment determination. This indicates the system 100 has lost sync and it may be time to recover sync by immediately applying an impulse without waiting any longer for phase alignment.

The step 1120 may be used to determine a direction for the impulse. A cause of the phase alignment to time out includes a position shift of the car seat occupant. A baby in a car seat may have a substantial mass relative to the car seat, and therefore even a small shift can substantially change the center of mass. Another cause includes an input from outside the system 100, such as somebody picking up the car seat 104 or moving it. So at step 1120, the processor assembly 302 may determine from the sensor 304 and/or the position of the inertial mass 118 whether the car seat 104 is leaning more forward or backward. If the car seat 104 is leaning more forward than backward the method 1100 proceeds to step 1118 to apply a backward impulse. If the car seat 104 is leaning more backward than forward, the method proceeds to step 1112 to apply a forward impulse.

At step 1108 the processor assembly 302 determines if a minimum period has elapsed since the previous impulse. If the minimum period has not elapsed, the method proceeds to step 1110 to wait until the minimum period has elapsed before generating a forward impulse. If the minimum period has elapsed, the method 1100 proceeds to step 1112 to generate the forward impulse.

At step 1110 the minimum period between phase alignments has not yet elapsed. Failure of the minimum period to elapse also occurs because the system 100 has lost sync. Put simply phase alignment is too soon, thus, outside the expected range. The reasons for phase alignment occurring too soon may generally be the same as phase alignment occurring too late. The occupant of the car seat 104 has shifted or someone has moved the car seat 104. In step 1110, the processor assembly 302 recovers from the loss of sync by waiting, e.g., using a wait loop, until the minimum period has elapsed. The method 1100 then proceeds to step 1112 to generate the forward impulse.

At step 1112, either the system 100 has reached backward (clockwise) phase alignment, and the minimum period since the previous impulse has elapsed, or the processor assembly 302 timed out while the car seat 104 was leaning more backward. The processor assembly 302 sends a signal to the actuator motor assembly 124 to move the inertial mass 118 from position 1 to position 2, which provides a forward impulse to the system 100. The method 1100 then proceeds to step 1102 as the system 100 proceeds to rock in the forward or counterclockwise direction. The rocking in the forward or counterclockwise direction is thus caused without applying any force to any objects adjacent to or outside of the system 100.

Steps 1114-1118 are similar to steps 1108-1112 but in the opposite direction. At step 1114 the processor assembly 302 determines if a minimum period has elapsed since the previous impulse. If the minimum period has not elapsed, the method 1100 proceeds to step 1116 to wait until the minimum period has elapsed before generating a backward impulse. If the minimum period has elapsed, the method 1100 proceeds to step 1118 to generate the backward impulse.

At step 1116 the phase alignment has occurred too soon and is outside the expected range. So the processor assembly 302 recovers from the loss of sync by waiting, e.g., using a wait loop, until the minimum period has elapsed. Then the method 1100 proceeds to step 1118 to generate the backward impulse.

At step 1118 either the system 100 has reached forward (counterclockwise) phase alignment, and the minimum period since the previous impulse has elapsed, or phase alignment timed out while the car seat 104 was leaning more forward. The processor assembly 302 sends a signal to the actuator motor assembly 124 to move or accelerate the inertial mass 118 from position 2 to position 1, which provides a backward impulse to the system 100. The method 1100 then proceeds to step 1102 as the system 100 proceeds to rock in the backward or clockwise direction. The rocking in the backward or clockwise direction is thus pumped without applying any force to any objects adjacent to or outside of the system 100.

Figure 12:
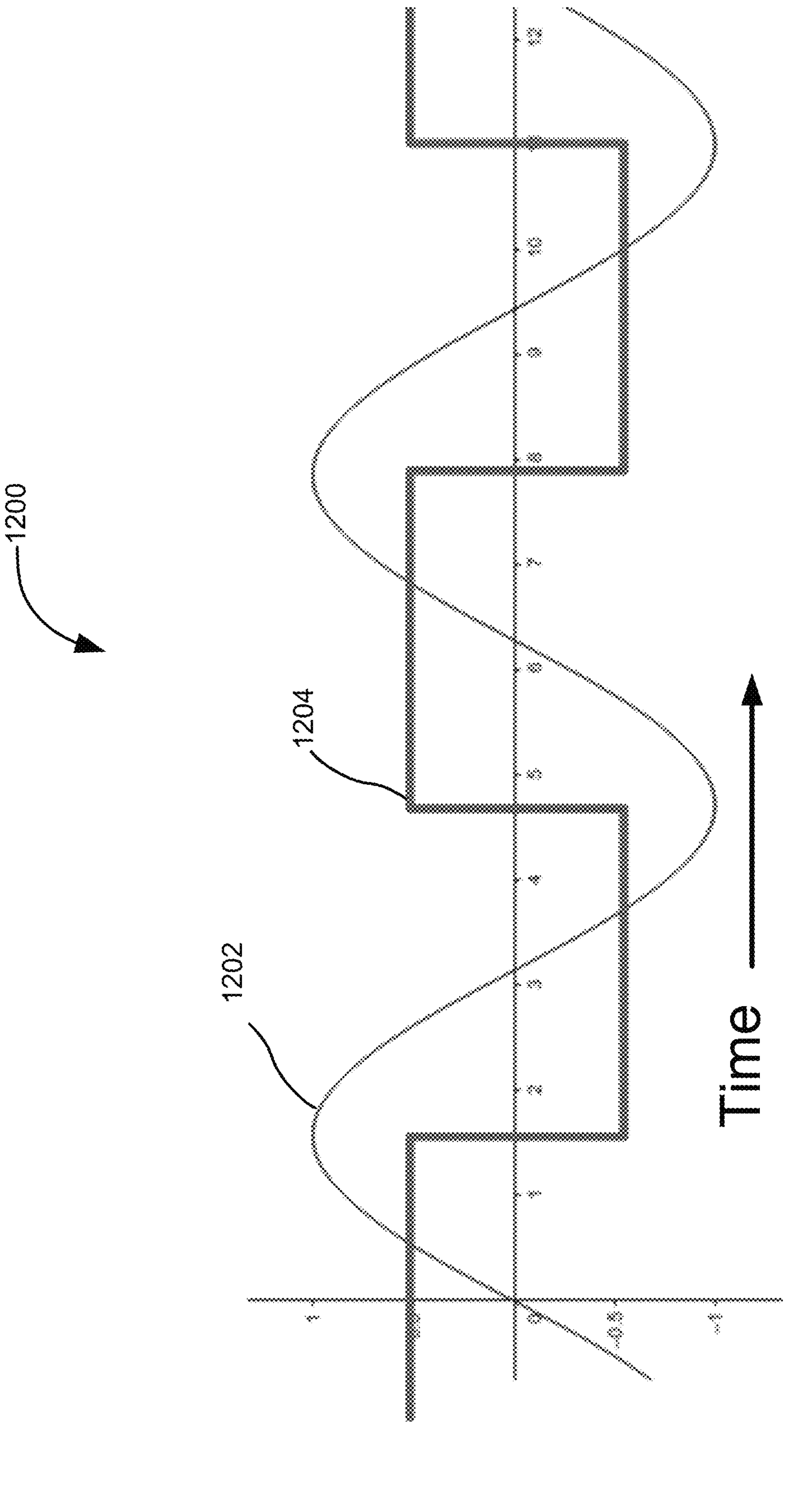
FIG. 12 is a graph illustrating position of the car seat in relation to position of the inertial mass, as a function of time.

FIG. 12 is a graph illustrating motion of the car seat 104 in relation to motion of the inertial mass 118, as a function of time. The graph of FIG. 12, may illustrate motion of Rocker at or about in resonance with a characteristic frequency of the rocking system. The horizontal axis represents time and the vertical axis represents relative angles of the car seat 104 and inertial mass 118. The values in the vertical and horizontal axis are dimensionless and not to scale. However, a positive value in the vertical axis represents a backward motion of the car seat 104 and inertial mass 118 as illustrated in FIG. 10A and FIG. 10B. A negative value in the vertical axis represents a forward motion of the car seat 104 and inertial mass 118 as illustrated in FIG. 10A and FIG. 10B. FIG. 12 is an idealized representation of the relation between the motions of the car seat 104 and inertial mass 118, and is presented for illustration purposes as an aid to understanding.

The angular motion of the car seat may be approximated as a sinusoidal curve as illustrated by curve 1202. A positive slope of the curve 1202 represents a clockwise rotation of the car seat 104. A negative slope of the curve 1202 represents a counterclockwise rotation of the car seat 104. The motion of the inertial mass may be approximated as a square wave as illustrated by curve 1204. A positive slope of the curve 1204 represents a clockwise rotation of the inertial mass 118. A negative slope of the curve 1204 represents a counterclockwise rotation of the inertial mass 118.

At about time 1.6 in the graph of FIG. 10A, the car seat 104 has rotated to about maximum clockwise or maximum backward position. The inertial mass 118 is at position 1 (positive) and transitions to position 2 (negative). The negative slope of the curve 1204 at time 1.6 during the transition from position 1-to position 2 represents a counterclockwise rotation of the inertial mass 118. The curve 1202 also begins a negative slope at about time 1.6, indicating the beginning of a counterclockwise rotation of the car seat 104.

At about time 4.8 in the graph of FIG. 10B, the car seat 104 has rotated to about maximum counterclockwise or maximum forward position. The inertial mass 118 is at position 2 (negative) and transitions to position 1 (positive). The positive slope of the curve 1204 at time 4.8 during the transition from position 2-to position 1 represents a clockwise rotation of the inertial mass 118. The curve 1202 also begins a positive slope at about time 4.8, indicating the beginning of a clockwise rotation of the car seat 104.

In some embodiments, the impulse is adjusted or synced based on a heartbeat of the car seat occupant. For example, the sensor 304 may be configured to detect the heartbeat using a filter, such as a Kalman filter. In another example, a smart watch exercise wrist band is configured for detecting the occupant's heartbeat, and may communicate the heartbeat to the rocker 102 via wireless, e.g., Bluetooth, WiFi, and/or the like. The smart watch, exercise band, and/or filter may further be used to detect a sleep state of the occupant and communicate the sleep state to a user via wireless. Optionally, a smart watch or exercise band may be used to detect a heartbeat of a person other than the occupant, such as a mother or father, and the impulse may be adjusted to sync to that detected heartbeat.

Music may also be played for the occupant and the impulses driving the system 100 may be adjusted to sync to a beat of the music. Alternatively, a beat of the music may be synced to the impulses driving the system 100. The music may be stored in memory of the rocker 102 or communicated via wireless. The music may be played using a speaker incorporated into the rocker 102 as one of the I/O devices 930.

The actuator motor assembly 124 may emit audible sounds depending upon the amplitude of signals applied by the processor assembly 302. Thus, the processor assembly 302 may store or receive audio selected for the occupant of the car seat 104, and provide the selected audio signals to the actuator motor assembly 124. The signals may be delivered, e.g., using I/O devices 930 at an amplitude that is audible to the occupant when summed on top of the periodic impulses used for driving the rocking of the system 100. Examples of selected audio include sounds of running water, wind, heartbeat, music, voices, rumbles, cars, and/or the like. The audible sounds may be synced to the timing of the impulses used for driving rocking of the system 100. Alternatively, the impulses driving the system 100 may be adjusted to sync to the audible sounds. In some embodiments, the selected sounds may be received via wireless communications, e.g., from a computing system such as a smart phone, iPad, or tablet.

More generally, the processor assembly 302 may provide random or pseudo random noise summed on top of the periodic impulses to drive the actuator motor assembly 124. This may be selected to emulate random jostling produced during motion of a car. The noise may be at audio frequency or sub-audio frequency and comprise white noise, pink noise, and or the like). The processor assembly 302 may be configured to monitor the state of the battery 112 and use LEDs to display the state of the battery 112.

In some embodiments, the processor assembly 302 is a smart device that is separate device from the rocker 102 and inertial mass 118. The smart device may be placed in the car seat 104, perhaps next to the occupant, where it senses the position and motion of the car seat 104 and/or occupant. The smart device may perform the calculations and execute algorithms for rocking the car seat 104 and communicate drive signals wirelessly to the actuator assembly 120.

For example, the rocker 102 may comprise an inertial mass 118 including a battery and switch, and an actuator assembly 120 coupled to the inertial device 118. The actuator assembly 120 may include an armature 122 coupled to a clamp assembly 128 for securing the rocker 102 to the car seat 104, and a rotating joint 126 between the armature 122 and the inertial mass 118. The rocker 102 may also include an actuator motor assembly 124 for periodically rotating the inertial mass 118 through a selected angle about the rotating joint 126 relative the car seat 104, the rotation of the inertial mass 118 about the joint 126 may be configured to impart a rotational acceleration to the car seat. The rocker 102 may further include a wireless module 306 to receive a periodic signal from a smart device. The rocker 102 may apply the received periodic signal to the motor assembly 124 to drive rotation of the inertial mass.

The smart device may comprise a motion sensor 304 and a processor 302 for monitoring motion of the car seat 104 in real time using the motion sensor 304. The smart device may filter the monitored motion of the car seat 104 to determine an angular velocity and estimate a phase alignment of the car seat 104 in real time from the monitored motion of the car seat 104. The processor 302 of the smart device may further calculate a new frequency and amplitude in real time for the periodic signal based on the determined angular velocity and estimated phase alignment of the car seat. The processor 302 may then update the periodic signal in real time using the new frequency and amplitude via a wireless module 306 disposed in the smart device.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. For example, the actuator assembly 120 may comprise an actuator motor assembly 124 and bearing 126 configured to position the inertial mass 118 along a substantially linear path, instead of rotating the inertial mass 118. For example, sensors may be used to monitor ambient conditions of the car seat, including sounds, temperature, moisture, pressure, crying, empty bottle, occupant sleep state, occupant activity, video, and/or the like. For example, wireless communications such as WiFi and bluetooth may be used for receiving and transmitting sensor data, commands, software updates, music, etc. For example, data sent out from the rocker 102 may include alerts based on monitored ambient and/or child conditions.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A rocker for rocking a car seat, the rocker comprising:
- a clamp assembly for securing the rocker to the car seat;
- an inertial mass coupled to the clamp assembly;
- an articulating joint between the clamp assembly and the inertial mass;
- an actuator motor assembly for articulating the joint to alternately accelerate the inertial mass relative the car seat from a first position toward a second position and to accelerate the inertial mass from the second position toward the first position, articulation of the joint configured to use the acceleration of the inertial mass to impart a rotational acceleration to the car seat without pushing against a surface external to the car seat;
- a motion sensor coupled to the inertial mass; and
- a processor coupled to the motion sensor and the actuator motor assembly, the processor configured for:
  - monitoring motion of the motion sensor;
  - filtering motion of the inertial mass to extract the motion of the car seat the from monitored motion of the sensor;
  - predicting in real time an angular velocity and phase of the car seat from the filtered angular motion;
  - calculating in real time a first time for applying a first impulse to the actuator motor assembly based on the predicted angular velocity and phase of the rocker;
  - applying the first impulse to the actuator motor assembly to accelerate the inertial mass from the first position to the second position at about the first calculated time, urging the car seat forward;
  - calculating a second time for applying a second impulse to the actuator motor assembly based on the predicted angular velocity and phase of the rocker; and
  - applying the second impulse to the actuator motor assembly to accelerate the inertial mass from the second position to the first position at about the second calculated time, urging the car seat backward.

2. The car seat rocker of claim 1, wherein the processor is further configured for:
- calculating a first amplitude of rocking of the rocker in response to acceleration of the inertial mass from the first position to the second position;
- determining whether the calculated amplitude is increasing, decreasing, or remaining constant; and
- adjusting timing of the first impulse to change the first amplitude.

3. The car seat rocker of claim 2, wherein the processor is further configured for:
- calculating a second amplitude of rocking of the rocker in response to acceleration of the inertial mass from the second position to the first position;
- determining whether the calculated amplitude is increasing, decreasing, or remaining constant; and
- adjusting timing of the second impulse to change the second amplitude.

4. The car seat rocker of claim 1, wherein the processor is further configured for:
- detecting a loss of sync condition indicated by a time period from the first calculated time to second calculated time that is outside of an expected range;
- if the time period is shorter than a minimum of the expected range waiting beyond the second time until the minimum time elapses before applying the second impulse.

5. The car seat rocker of claim 4, wherein the processor is further configured for:
- determining if the time period exceeds a maximum of the expected range; and
- applying the second impulse immediately, without waiting until the second calculated time.

6. The car seat rocker of claim 1, further comprising an audio speaker coupled to the processor.

7. The car seat rocker of claim 6, wherein the processor is further configured for:
- playing music using the audio speaker;
- and syncing the music to a period between the first and second time.

8. The car seat rocker of claim 1, wherein the processor is further configured for:
- filtering sensor data to detect a heartbeat of an occupant of the car seat; and
- adjusting the first and second time based on the heartbeat.

9. The car seat rocker of claim 1, wherein the processor is further configured for:
- providing audio signals to the actuator motor assembly at an amplitude that is audible to an occupant when summed on top of the first and second impulses.

10. An apparatus for rocking a car seat, the apparatus comprising:
- a clamp assembly for securing the apparatus to the car seat;
- an inertial mass coupled to the clamp assembly;
- a rotating joint between the clamp assembly and the inertial mass;

rotation means for periodically rotating the inertial mass through a selected angle about the rotating joint relative the car seat, rotation of the inertial mass about the joint configured to impart a rotational acceleration to the car seat without using the apparatus to apply a force to a surface adjacent to the car seat;

a motion sensor coupled to the apparatus; and a processor coupled to the motion sensor and the rotation means, the processor configured for:

applying a periodic signal to the rotation means to drive rotation of the inertial mass;

monitoring motion of the motion sensor in real time;

filtering motion of the inertial mass to estimate an angular velocity and predict a phase alignment of the car seat in real time from the monitored motion;

calculating in real time a new frequency and amplitude for the periodic signal based on the determined angular velocity and estimated phase alignment of the car seat; and updating the periodic signal in real time using the new frequency and amplitude.

11. The apparatus of claim 10, wherein the inertial mass includes a battery for providing power to the rotation means, processor, and motion sensor.

12. The apparatus of claim 10, wherein the selected angle is determined in real time based on an amplitude of the car seat, the angular velocity and phase alignment of the car seat.

13. The apparatus of claim 10, wherein the periodic signal is at least one of a sinusoidal wave, a triangular wave, a pulse-width-modulated wave, saw-tooth wave, a stokes wave, a periodic spike, a periodic impulse, and a square wave.

14. The apparatus of claim 10, further comprising adding a second signal to modulate the periodic signal being applied to the rotation means.

15. The apparatus of claim 14, further comprising a wireless receiver coupled to the processor, the wireless receiver configured to receive data and provide the data to the processor for use to generate the second signal and modulate the periodic signal being applied to the rotation means.

16. A method for rocking a car seat, the method comprising:

monitoring data from a motion sensor coupled to an inertial mass secured to the car seat using an articulating armature;

filtering the monitored data from the motion sensor in real time to extract motion of the car seat from combined motion of the inertial mass and car seat;

predicting a backward phase alignment of the car seat from the filtered data;

at about reaching a backward phase alignment, applying a forward drive to an actuator motor assembly coupled to the inertial mass and the armature to rotate the inertial mass relative the car seat from a first position to a second position and accelerate the car seat in a forward direction without exerting a force against an object external to the car seat;

predicting a forward phase alignment of the car seat from the filtered data; and at about reaching a forward phase alignment, applying a backward drive to the actuator motor assembly to rotate the inertial mass relative the car seat from the second position to the first position and accelerate the car seat in a backward direction without exerting a force against an object external to the car seat.

17. The method of claim 16, further comprising:

at about reaching backward phase alignment, calculating a period since the last applied drive; and if the period since the last applied drive is less than a desired minimum, wait until the period exceeds the minimum before applying the forward drive.

18. The method of claim 16, further comprising:

calculating if the period since the last applied drive while waiting to reach backward or forward phase alignment;

if the period is greater than a desired maxim, determining whether the car seat is leaning forward or backward using the sensor;

if the car seat is leaning forward, applying a backward drive to the actuator motor assembly to rotate the inertial mass relative the car seat and accelerate the car seat in a backward direction; and if the car seat is leaning backward, applying a forward drive to the actuator motor assembly to rotate the inertial mass relative the car seat and accelerate the car seat in a forward direction.

19. The method of claim 16, wherein the forward and backward drive used for acceleration in the forward and backward direction is about a square wave.

20. The method of claim 16, wherein the forward and backward drive used for acceleration in the forward and backward direction is about a sinusoidal wave.

* * * * *